United States Patent [19]
Protz, Jr.

[11] Patent Number: 5,562,269
[45] Date of Patent: Oct. 8, 1996

[54] MINI BULB HOLDER

[75] Inventor: William F. Protz, Jr., Lake Forest, Ill.

[73] Assignee: Santa's Best, Northfield, Ill.

[21] Appl. No.: 387,132

[22] Filed: Feb. 9, 1995

[51] Int. Cl.⁶ ........................................................ F16L 3/08
[52] U.S. Cl. ................. 248/74.2; 248/205.5; 248/316.1;
       248/912; 362/249; 362/391; 362/397; 362/806
[58] Field of Search ............................... 248/74.2, 205.5,
       248/316.1, 316.7, 683, 912

[56]                 References Cited

U.S. PATENT DOCUMENTS

| 2,806,314 | 9/1957  | Moran   | 362/397 X |
| 2,849,601 | 8/1958  | Walzer  | 362/397 X |
| 3,189,310 | 6/1965  | Trueson | 362/249 X |
| 4,901,960 | 2/1990  | Gary .  |           |
| 4,962,907 | 10/1990 | Gary .  |           |
| 5,110,078 | 5/1992  | Gary    | 362/249 X |
| 5,361,192 | 11/1994 | Lai     | 362/806 X |
| 5,481,444 | 1/1996  | Schultz | 362/391 X |
| 5,510,966 | 4/1996  | Konecny | 362/249   |

Primary Examiner—Ramon O. Ramirez
Assistant Examiner—Michael J. Turgeon
Attorney, Agent, or Firm—Emrich & Dithmar

[57]                      ABSTRACT

A fixture for holding a wire carrying a string of decorative lights in place on a support surface with the lights being positioned parallel or perpendicular to the support surface. The fixture includes a substantially flat base member for mounting on a support surface with spaced apart pairs of trapping members for frictionally engaging the wire carrying the decorative lights. Spacers are present for positioning a decorative bulb in a direction parallel to the support surface. The fixture has trapping members contacting and removably holding the wire in a string of decorative bulbs in place while an associated decorative bulb is loosely maintained in a direction perpendicular or parallel to the support surface.

11 Claims, 1 Drawing Sheet

5,562,269

MINI BULB HOLDER

BACKGROUND OF THE INVENTION

This invention relates to devices for holding decorative lights, and more particularly, to a decorative light support assembly adapted to support a decorative bulb and socket assembly on a relatively smooth, substantially planar surface such as glass or wood, although other surfaces such as traditional wallboard or the like are contemplated.

A variety of devices have been used in the past and have been patented such as those represented in U.S. Pat. Nos. 4,901,960 issued to Gary, Feb. 20, 1990, 4,962,907 issued Oct. 16, 1990 to Gary, and U.S. Pat. No. 5,110,078 issued May 5, 1992 to Gary. The first two patents were directed to devices in which a bulb is held by two fingers which are positioned closer at the bottom than at the top so as to receive a mini light bulb of the type used on Christmas decorations when it is wedged between the two upstanding fingers. The '078 patent relates to a simple two piece combination of a suction cup and a holder which is adapted to receive therebetween a mini light bulb such that the bulb is arranged parallel to the support surface rather than perpendicular to the support surface as in the '960 and '078 patents previously referenced.

While the devices disclosed in the various Gary patents may be adequate for their intended purposes, there are certain shortcomings inherent in the devices. A significant shortcoming is that none of the devices provide the flexibility of mounting mini light bulbs either parallel to or perpendicular to the support surface on which the assembly is mounted, the Gary devices requiring either that the bulb be mounted perpendicular to the support surface as in the '907 patent and the '960 patent or parallel to the support surface as in the '078 patent.

SUMMARY OF THE INVENTION

Accordingly, a decorative light support assembly is provided that comprises a fixture which may be either mounted by suction cup to an associated support surface or by an adhesive strip to an associated support surface which accommodates mini light bulbs in either an orientation that is generally perpendicular to the support surface or generally parallel to the support surface.

An object of the present invention is to provide a fixture for holding a wire which supports a variety of mini bulbs rather than the mini bulb holder per se.

Yet an other object of the present invention is to provide a fixture which has flexible pairs of trapping members extending therefrom which accommodate mini bulbs positioned either perpendicular to the fixture base member or parallel to the fixture base member.

Yet another object of the present invention is to provide a fixture which does not rely on frictionally trapping the mini light bulb or the mini light bulb holder but rather frictionally engages the wire in which connects the various mini light bulbs in a string of such.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
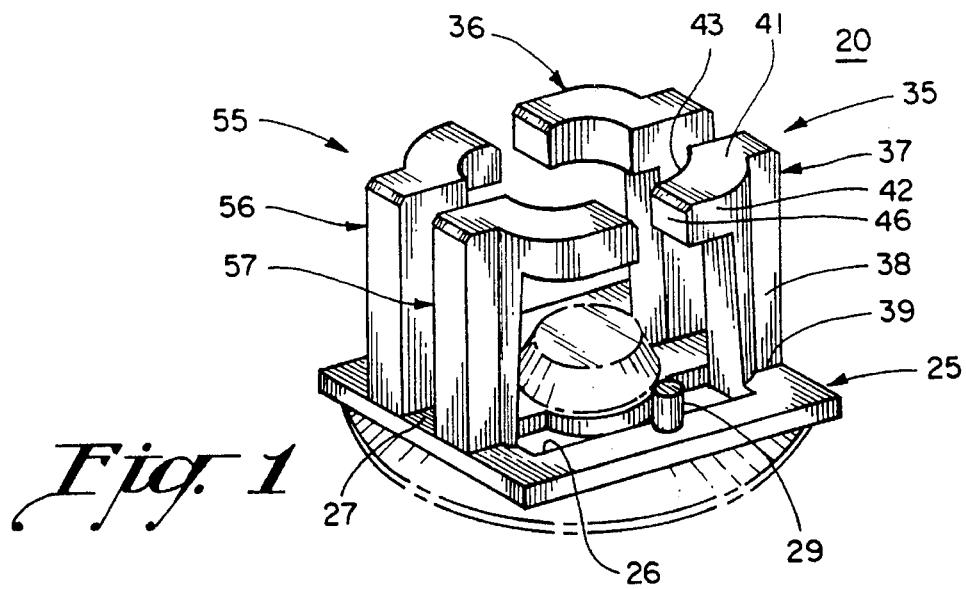
FIG. 1 is a perspective view of the fixture of the present invention.
Figure 2:
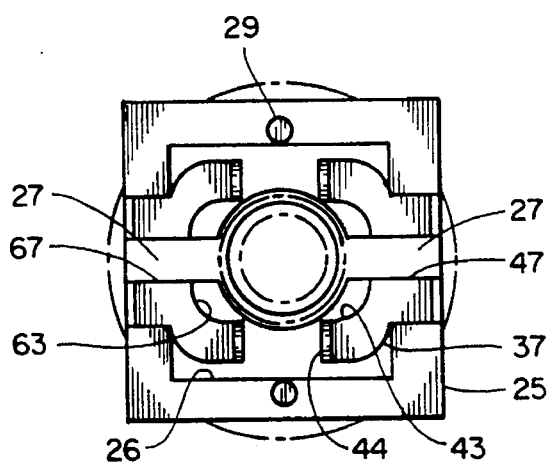
FIG. 2 is top plan view of the fixture illustrated in FIG. 1.
Figure 3:
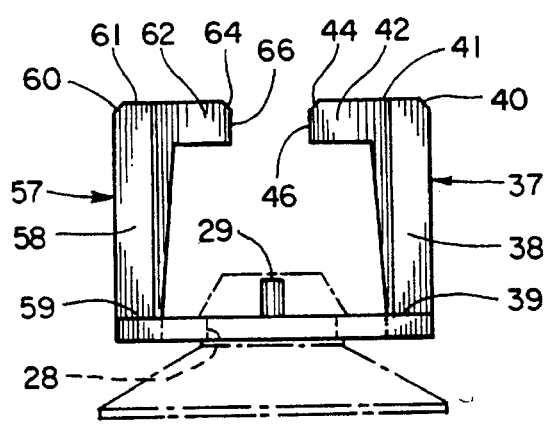
FIG. 3 is a front elevational view of the fixture illustrated in FIG. 1.
Figure 4:
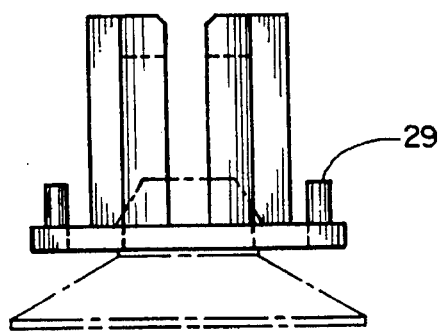
FIG. 4 is an end elevational view of the fixture illustrated in FIG. 1.

Referring now to the drawings, there is shown a mini bulb holder 20 having a flat planar base member 25 having an generally square opening 26 therein. A strip 27 extends through the opening 26 and a forms part of the base member 25, the strip 27 having a circular aperture 28 therein. A pair of pins 29 extend upwardly from the base member 25 adjacent the opening 26.

A pair of trapping members 35 extend upwardly from one end of the base member 25 and are generally flexible and consist of two trapping members 36 and 37. The trapping member 37 includes an upright 38 having an end 39 intersecting the base 25 and an end 41 away from the base 25, the portion of the upright 37 intersecting the end 41 and the upright 38 is chamfered as at 40.

An arcuate finger member 42 extends from the upright 38 and has an arcuate inner surface 43 terminating in a chamfered surface 44 and an end surface 46. The finger 42 has an inner trapping surface 47 which is in general alignment with the strip 27 previously described.

The other trapping member 36 of the pair 35 of trapping members is a mirror image of the trapping member 37 just described so that the arcuate finger extends in an opposite direction of the finger 42 so that the arcuate inner surface 43 of the upright 38 and the corresponding arcuate inner surface of the other trapping member 36 form part of the periphery of an oval, making up a generally oval shape. As seen from the drawings, the trapping surface 47 on the upright 38 and the corresponding trapping surface on the upright 36 are parallel and perpendicular to the base 25.

Another pair 55 of trapping members comprising a trapping member 56 and a trapping member 57 is mounted on the base 25 at the edge thereof opposite to the pair 35 of trapping members. The trapping members 56 and 57 are configured generally the same as the trapping members just described with the trapping member 57 being the same as the trapping member 36 and the trapping member 56 being the same as the trapping member 37.

More specifically, the trapping member 57 has an upright 58 having an end thereof 59 joined to the base 25 or extending from the base 25 and an end 61 thereof away from the base with a chamfered surface 60 at the end 61. An arcuate finger 62 extends away from the upper end 61 of the trapping member 57 toward the associated finger 42 of the trapping member 37. The finger 62 has an arcuate inner surface 63 and a chamfered surface 64 along with an end surface 66, all as previously described with respect to the upright 38. The upright 58 further has an inner trapping surface 67 which is co-planar with the trapping surface 47 previously described.

In general the trapping member 57 is in alignment with the trapping member 37 and the trapping member 56 is in alignment with the trapping member 36. The upright 38 of trapping member 36 and the upright 58 of trapping member 57 are drafted such that the ends 39 and 59 intersecting the base 25 are further away from each other than at the taps or ends 41 and 61. The pairs 35 and 55 of trapping members cooperate to trap the wire in a string of mini bulbs between the associated trapping members 36 and 37 for the pair 35 and 56 and 57 for the pair 55.

A bulb on a string of wire trapped between the pairs 35 and 55 is loosely positioned in the general oval shape defined by the fingers 42 and 62 respectively of the trapping members 37 and 57. The other trapping members that is the trapping member 36 and 56 have not been described in detail since they are exactly the same as the trapping members previously described, but the four trapping members define an oval space therebetween and four points of contact for an associate bulb to maintain generally perpendicular alignment of the bulb with the base 25.

In the present invention, neither the mini bulb itself nor the holder for the mini bulb has to be jammed down into the device 20 to be held in its preferred position. Rather, it is the wires which are trapped between the uprights of the trapping members 36 and 37 on the one hand, of pair 35 and the uprights for trapping members 56 and 57 for the pair 55 on the other hand. The junctures between the chamfered surface 44 and the inner arcuate surface 43 is generally in contact or almost in contact with a mini bulb with it is positioned perpendicular to the base 25 such that there are about four points of contact for the bulb.

When it is desired for the associated bulb to be positioned parallel to the base 25 or to the support surface on which it is mounted, then the pins 29 serve to maintain the bulb in position and away from the base or the underlying support surface, there being two such pins 29 provided so that the bulb can extend from either end of the base 25. While a suction cup has been illustrated, it is contemplated that an adhesive pad or other suitable mechanism may be used to mount the fixture 20 to the associated support surface.

While there has been disclosed what is considered to be the preferred embodiment of the present invention, it is understood that various changes in the details may be made without departing from the spirit, or sacrificing any of the advantages of the present invention.

I claim:

1. A fixture for holding a wire carrying a string of decorative lights in place on a support surface with the lights being positioned parallel or perpendicular to the support surface, comprising a substantially flat base member for mounting on a support surface; spaced apart pairs of trapping members mounted on said flat base member for frictionally engaging the wire carrying the decorative lights, and means for positioning a decorative light in a direction parallel to the support surface; said trapping members contacting and removably holding the wire in place while an associated decorative light is loosely maintained in a direction perpendicular or parallel to said flat planar base member and the support surface.

2. The fixture of claim 1, wherein each pair of trapping members is positioned near an end of said base member and includes two substantially vertical uprights closer to each other at the ends thereof contacting said flat base member than at the ends thereof spaced away from said base member.

3. The fixture of claim 1, wherein each pair of trapping members has spaced arms for loosely positioning a decorative light generally perpendicular to said base member.

4. The fixture of claim 3, wherein said arm has an arcuate portion having one contact point thereon for contacting an associated light light to maintain the light bulb substantially perpendicular to said flat base member.

5. The fixture of claim 1, wherein each pair of trapping members is spaced from the other pair of trapping members a distance sufficient to permit a decorative light to be positioned between said pairs with the light bulb generally parallel to said flat base.

6. The fixture of claim 5, and further including an upstanding member on said flat base between said pairs of trapping members to maintain the light spaced from said base member when the light is parallel thereto.

7. The fixture of claim 1, wherein said base member is adapted to carry a suction cup or an adhesive for mounting to the associated support surface.

8. The fixture of claim 1, wherein there are four trapping members arranged two to a pair, one trapping member of each pair being opposite to a trapping member of the other pair.

9. The fixture of claim 1, wherein said pair of trapping members define a pathway therebetween for trapping the wire carrying a string of decorative lights, the pathways defined by said pairs of trapping members being aligned.

10. The fixture of claim 9, wherein said trapping members are resilient such that they can be deflected to receive a wire there between.

11. A fixture for holding a wire carrying a string of decorative lights in place on a support surface with the lights being positioned parallel or perpendicular to the support surface, comprising a substantially flat base member for mounting on a support surface; two pair of aligned spaced apart trapping members mounted on said base member for frictionally engaging the wire carrying the decorative lights, said pairs of trapping members being inclined toward each other such that the top ends are closer to each other than the ends contacting said base member, and means for positioning a decorative light in a direction parallel to the support surface; said trapping members contacting and removably holding the wire in place while an associated decorative light is loosely maintained in a direction perpendicular or parallel to said flat planar base member and the support surface.

\* \* \* \* \*

UNITED STATES PATENT AND TRADEMARK OFFICE
CERTIFICATE OF CORRECTION

PATENT NO. : 5,562,269
DATED : October 8, 1996
INVENTOR(S) : William F. Protz, Jr.

It is certified that error appears in the above-indentified patent and that said Letters Patent is hereby corrected as shown below:

Column 4, line 16:
Claim 4, line 2, delete "light", second occurrence.

Signed and Sealed this

Eleventh Day of February, 1997

Attest:

BRUCE LEHMAN

*Attesting Officer*     *Commissioner of Patents and Trademarks*